Patented Aug. 26, 1924.

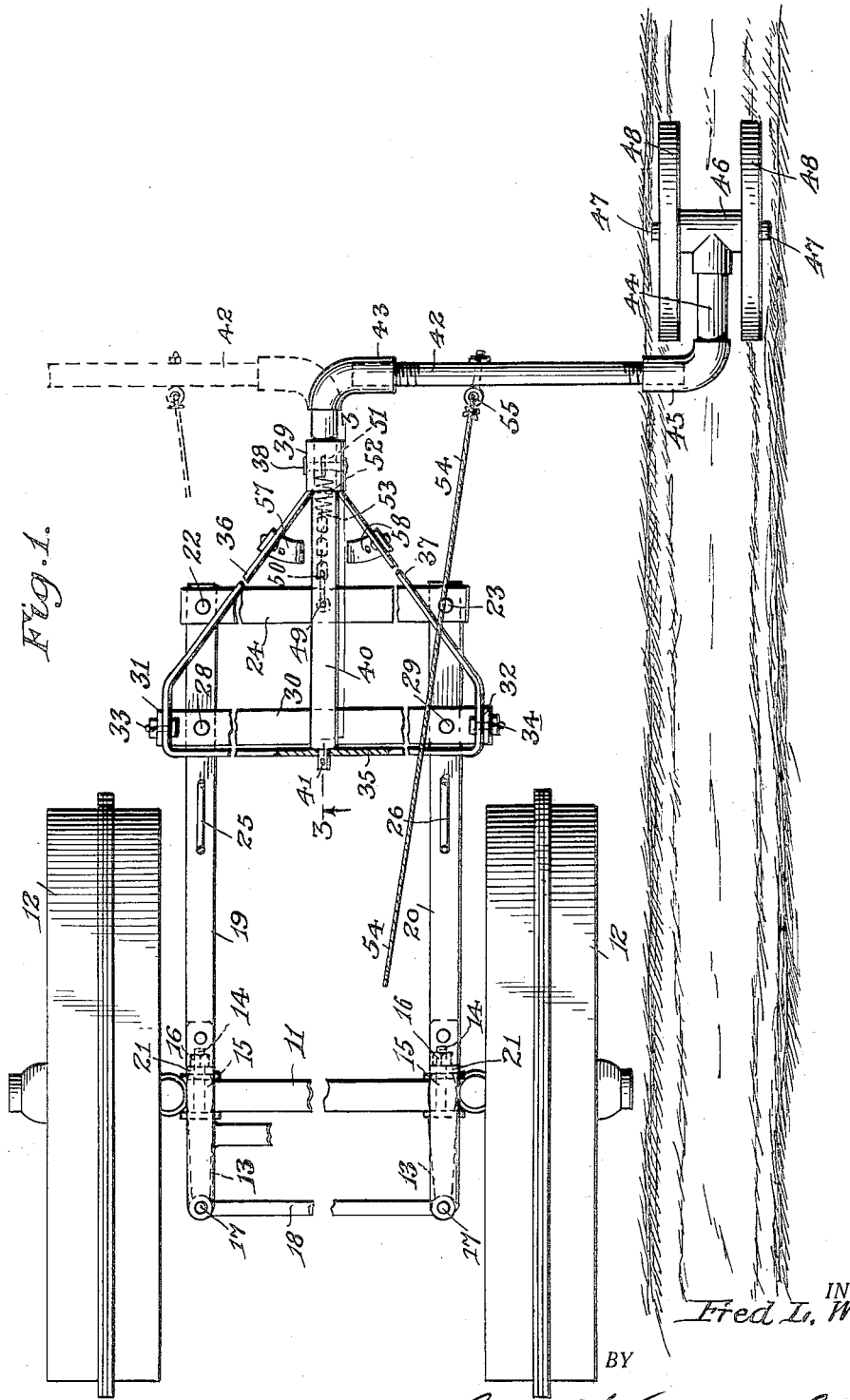

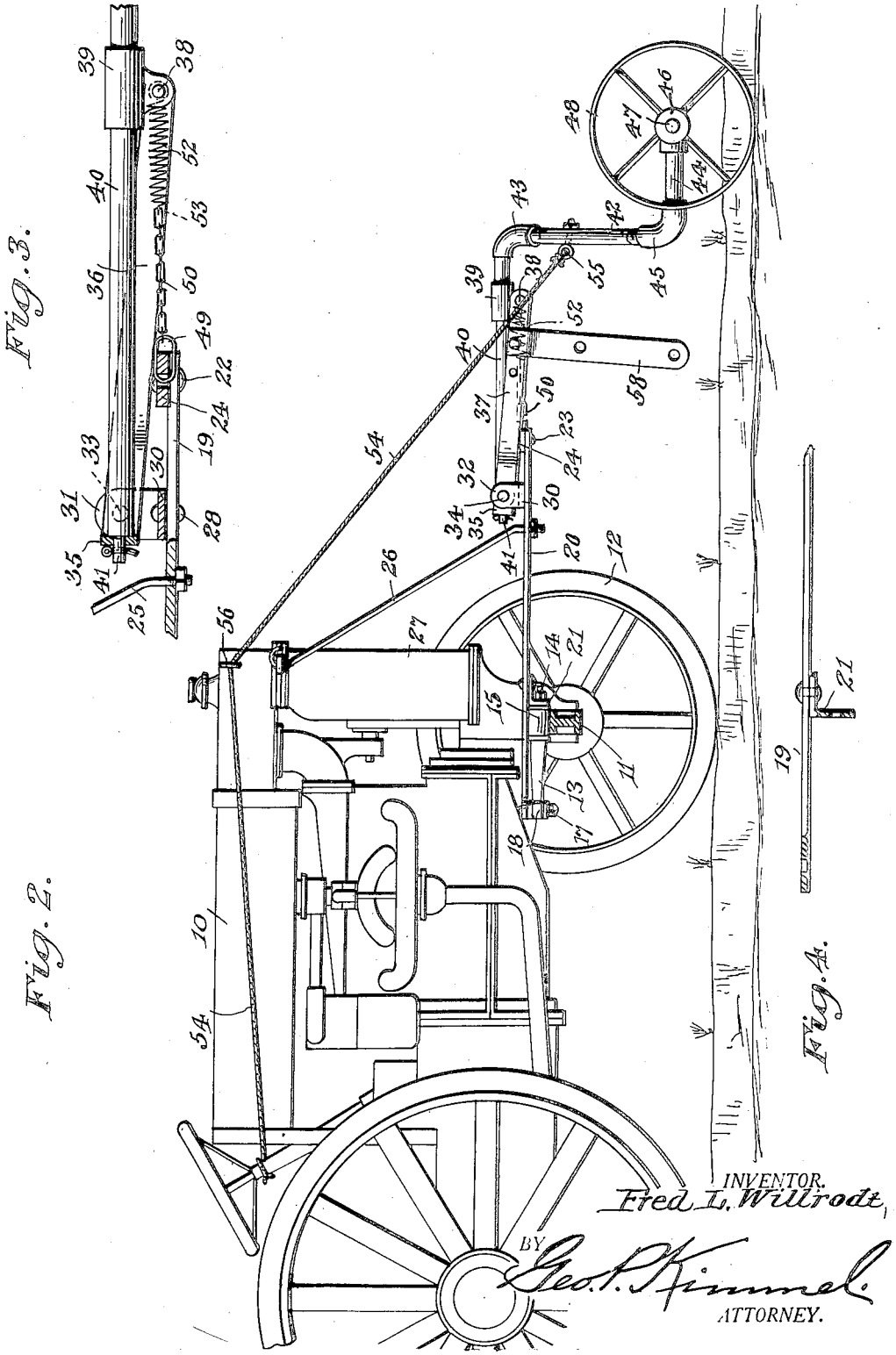

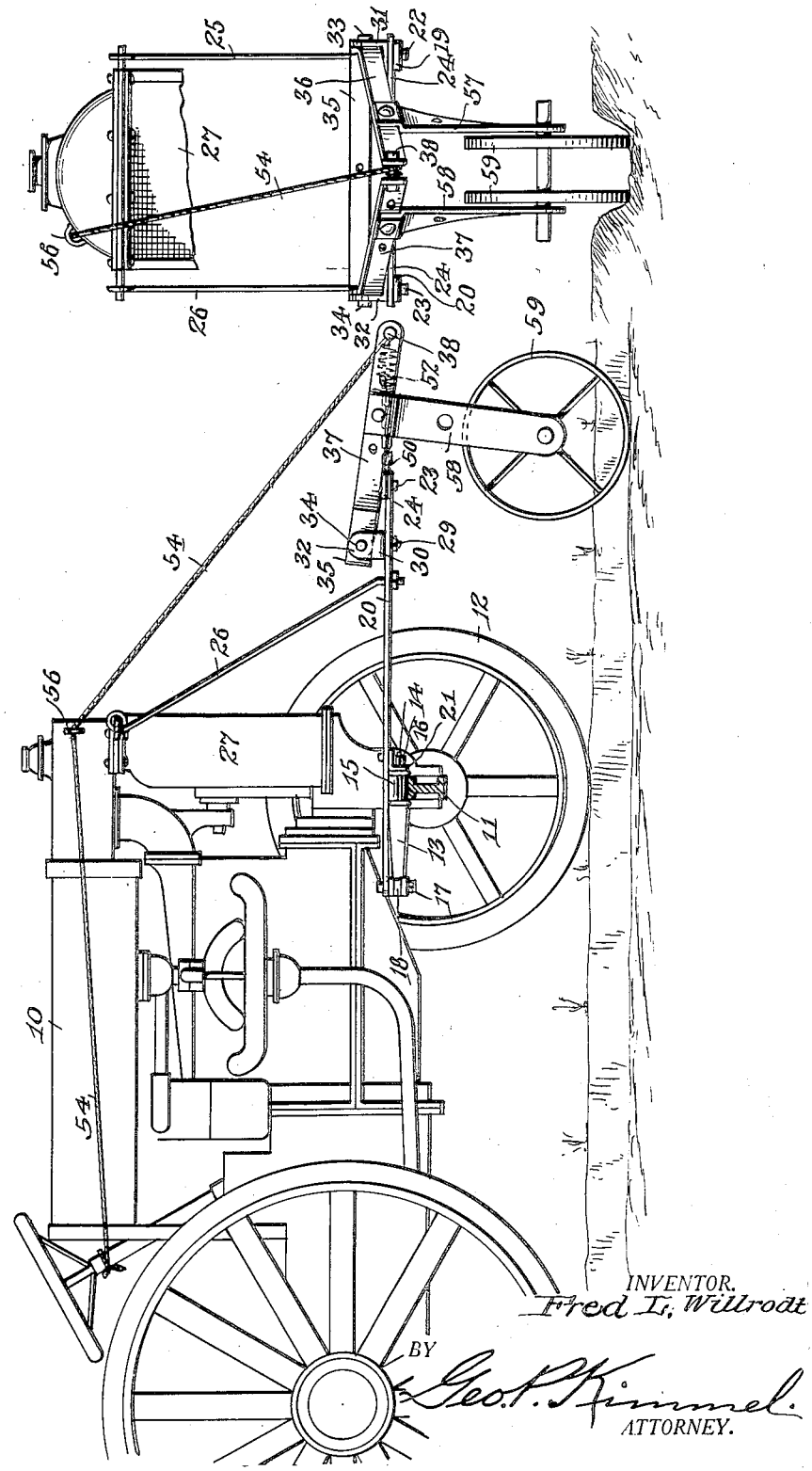

1,506,706

UNITED STATES PATENT OFFICE.

FRED L. WILLRODT, OF BIJOU HILLS, SOUTH DAKOTA.

STEERING ATTACHMENT FOR TRACTORS.

Application filed July 17, 1923. Serial No. 652,123.

*To all whom it may concern:*

Be it known that I, FRED L. WILLRODT, a citizen of the United States, residing at Bijou Hills, in the county of Brule and State of South Dakota, have invented certain new and useful Improvements in Steering Attachments for Tractors, of which the following is a specification.

This invention relates to attachments for tractors and like vehicles when employed for drawing plows of different constructions, and has for one of its objects to provide a device of this character adapted to be coupled to the forward axle to follow a furrow previously formed, and thus guide the tractor and the plow in forming the next furrow in parallel relation to the previously formed furrow.

Another object of the invention is to provide a device of this character having guiding means adapted to be arranged to travel in a furrow at the right, at the left, or directly in the center of the line of travel of the vehicle.

With these and other objects in view, the invention consists in certain novel features of constuction as hereinafter shown and described and then specifically pointed out in the claims, and in the drawings illustrative of the preferred embodiment of the invention—

Figure 1 is a plan view of the forward part of a conventional tractor with the improved attachment applied for operating the guide wheels laterally.

Fig. 2 is a side elevation with the axle of the vehicle in transverse section.

Fig. 3 is an enlarged detail in section on the line 3—3 of Fig. 1.

Fig. 4 is a detached detail of one of the main frame rails.

Fig. 5 is a view similar to Fig. 2, illustrating the arrangement and operation of the guide wheels when arranged centrally.

Fig. 6 is a front elevation of the structure arranged as shown in Fig. 5.

The improved device may be applied without material structural change to motor driven vehicles of various makes, but is more particularly adapted to application to the Fordson type of tractor, and for the purpose of illustration is shown thus applied, the body of the tractor being indicated as a whole at 10, the forward axle at 11, the forward bearing wheels at 12, and the spindle arms of the steering apparatus at 13, the latter each including a forward pin 14 extending through the head members 15 of the spindle devices and secured in place by clamp nuts 16. At their rear ends, the spindle arms are pivoted at 17 to the connecting rod 18, these parts being of the usual construction.

The improved attachment comprises spaced side or rail members 19 and 20 each apertured at the rear end to receive the pivot pins 17 of the spindle arms, and with L-shaped clips 21 attached to their lower faces and apertured to receive the pins 14 of the spindle arms and secured in place by the clamp nuts 16.

At their forward ends, the rail members 19 and 20 are pivotally coupled by a link member 24, as shown at 22 and 23.

By this means, the rail members 19 and 20 are rigidly coupled to the spindle arms and move therewith so that the rail members are maintained in constant parallel relation with each other and with the bearing wheels 12, as the tractor is moved forwardly.

The rail members 19 and 20 and their attachments are supported by obliquely positioned brace rods 25 and 26 and coupling the rail members to some position on the radiator, indicated at 27.

Pivoted at 28 and 29 to the rail members 19 and 20 is a support 30 having upturned apertured ends as shown at 31 and 32.

Pivoted at 33 and 34 to the ears 31 and 32 is a yoke like frame comprising a transverse base portion 35 and converging side portions 36 and 37, the latter coupled at 38 at their forward ends to a bearing member 39.

Mounted for rotation in the bearing 39 is a shaft 40, the shaft being pivoted at its rear end at 41 in the transverse portion 35 of the yoke frame. The shaft 40 is preferably constructed of piping, and is provided with a lateral branch 42, threaded, and coupled by its threaded portion to the main shaft 40 by an internally threaded elbow 43. At the outer end, the lateral branch 42 is coupled by its threaded portion to a shorter longitudinal branch 44 by an internally threaded elbow 45.

At its outer end, the branch 44 is coupled by its threaded portion to a T-head 46, and mounted for rotation through the head is an axle member 47 carrying guide wheels 48, as shown.

One arm of each of the elbows 43 and 45 is elongated, and the threads on the member 42 are formed of a greater length than an ordinary piping to enable the elbows 43 or 45 or both, to be adjusted thereon to control the distance between the center of the shaft 40 and the wheels 48, the object to be hereinafter explained.

The shaft 40 is rotative in the bearing 39 and the base member 35 of the yoke frame, to enable the wheels 48 to be located at either side, as indicated by broken lines in Fig. 1.

Connected at 49 to the transverse member 30 is a section of chain 50, and coupled at one end at 51 to the coupling pin 38 of the bearing 39 is a spring 52, the adjacent ends of the spring and chain being connected as shown at 53.

The spring exerts a constant pulling force downwardly upon the yoke frame, and its attachments, to hold the bearing wheels 48 yieldably in position.

A pull cable 54 is attached at 55 to the lateral branch 42 and leads thence to a point convenient to the operators' seat, not shown. The pull cable 54 leads over a suitable guide 56 on the radiator 27, or some other part of the tractor.

By this means, when the guide device is not to be used, as for instance when the tractor is to be turned around at the end of the furrow, or when being moved from place to place, the pull cable enables the branch 42 with its attached guide wheels 48 to be turned into an upwardly directed position and the yoke frame likewise drawn upwardly against the resistance of the spring 52 with the branch and its wheels extending over the radiator.

Depending from the sides 36 and 37 of the yoke frame are hangers 57 and 58 adapted to support twin guide wheels 59 in place of the wheels 48, as shown in Figs. 4 and 5.

In operating with the improved device, the yoke frame with its attachments is turned up out of the way, and the first furrow formed in the usual manner. If the succeeding furrows are to be formed at one side of the line of travel of the tractor, right or left, the wheels 59 will be detached and the wheels 48 only retained and lowered into position to travel in the furrow just formed and accurately guide the plows to cause them to form the next furrow in parallel relation to the guiding furrow. At the end of the row, the yoke frame and its attachments is elevated, the tractor turned, and the guide wheels reset to travel in the last furrow formed, and so on repeatedly.

If the tractor is to be run over the furrow instead of alongside, the shaft 40 will be released at the coupling 41, and removed together with its coupled guide wheels 48, and the guide wheels 59 installed in the hangers 57 and 58, to travel in a furrow directly beneath the tractor.

The improved device may thus be adapted to various conditions of soil and the various arrangements of the furrows.

The central guide wheel arrangement will be used in cultivating listed corn or any crop where the furrow is centrally of or beneath the tractor.

The branch 42 being adjustable in the elbows 43 or 45, or both, the wheels 48 may be adjusted, to correspond to the distances between the furrows.

When the device is arranged as shown in Figs. 5 and 6 the pull cable 54 will be attached to the coupling pin 38, as shown.

The improved device may be constructed of any required size, and of any suitable material, and adapted to be attached to tractors of different forms and makes without material structural change.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

1. An apparatus of the class described comprising a frame formed in spaced side rails adapted to be coupled to swing with the spindle arms and forward wheels of a motor driven vehicle, a coupling member pivotally united to the free ends of said rails, a yoke frame mounted to swing vertically relatively to said side rails, hangers depending from said yoke frame, and guide wheels mounted for rotation in said hangers.

2. In an apparatus of the class described, a frame formed of spaced side rails adapted to be coupled to swing with the spindle arms and forward wheels of a motor driven vehicle, a coupling member pivotally united to the free ends of said rails, a yoke frame mounted to swing vertically relatively to said side rails, a shaft journaled on said yoke frame, and formed with a lateral branch and guide wheels carried by said lateral branch.

3. An apparatus of the class described comprising a frame formed of spaced side rails adapted to be coupled to swing with the spindle arms and forward wheels of a motor driven vehicle, a yoke frame mounted to swing vertically relative to said side rails, hangers depending from said yoke frame, and guide wheels mounted for rotation in said hangers.

4. An apparatus of the class described comprising a frame formed of spaced side rails adapted to be coupled to swing with the spindle arms and forward wheels of a motor driven vehicle, a coupling member pivotally united to the free ends of said rails, a yoke frame including converging side members and mounted to swing vertically relative to said guide rails, a bearing supported between the converged ends of said yoke frame, a shaft journaled in said bearing and in said yoke frame, a lateral branch extending from said shaft, and guide wheels carried by said lateral branch.

In testimony whereof, I affix my signature hereto.

FRED L. WILLRODT.